(12) United States Patent
Lim et al.

(10) Patent No.: US 9,425,884 B2
(45) Date of Patent: Aug. 23, 2016

(54) COMMUNICATION METHOD OF A MACRO BASE STATION, A VEHICULAR MOVING RELAY, AND A VEHICULAR MOVING TERMINAL

(75) Inventors: Jong Bu Lim, Yongin-si (KR); Tae Soo Kwon, Hwaseong-Si (KR); Woo Geun Ahn, Yeongcheon-si (KR); Byoung Hoon Jung, Daejeon (KR); Han Sung Leem, Daejeon (KR); Dan Keun Sung, Daejeon (KR); Dong Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 471 days.

(21) Appl. No.: 13/157,604

(22) Filed: Jun. 10, 2011

(65) Prior Publication Data

US 2012/0113838 A1 May 10, 2012

(30) Foreign Application Priority Data

Nov. 10, 2010 (KR) .................. 10-2010-0111399

(51) Int. Cl.
*H04B 7/155* (2006.01)
*H04B 7/02* (2006.01)
*H04W 84/00* (2009.01)
*H04W 84/04* (2009.01)
*H04B 7/08* (2006.01)

(52) U.S. Cl.
CPC ............ *H04B 7/15507* (2013.01); *H04B 7/026* (2013.01); *H04B 7/0837* (2013.01); *H04B 7/15592* (2013.01); *H04W 84/005* (2013.01); *H04W 84/047* (2013.01)

(58) Field of Classification Search
CPC .................................... H04B 7/15542
USPC .......................... 370/315; 455/11.1
See application file for complete search history.

(56) References Cited

U.S. PATENT DOCUMENTS

| | | | |
|---|---|---|---|
| 4,539,706 A | 9/1985 | Mears et al. | |
| 6,345,186 B1 | 2/2002 | Schultz et al. | |
| 2005/0058058 A1* | 3/2005 | Cho et al. | 370/208 |
| 2005/0093717 A1 | 5/2005 | Lilja | |
| 2005/0148334 A1 | 7/2005 | Peeters | |
| 2006/0083160 A1* | 4/2006 | Koo | H04L 27/0014 370/208 |
| 2006/0135063 A1* | 6/2006 | Katz | 455/25 |
| 2008/0107091 A1* | 5/2008 | Ramachandran | 370/338 |
| 2009/0073916 A1* | 3/2009 | Zhang et al. | 370/315 |

(Continued)

FOREIGN PATENT DOCUMENTS

| | | |
|---|---|---|
| JP | 2008-160543 | 7/2008 |
| KR | 10-2003-0088730 | 11/2003 |

(Continued)

*Primary Examiner* — Ayaz Sheikh
*Assistant Examiner* — Mariela Vidal Carpio
(74) *Attorney, Agent, or Firm* — NSIP Law

(57) ABSTRACT

Provided are examples of methods of a vehicular moving relay in a communication system including the vehicular moving relay, a moving terminal, and a macro base station. Also provided is an example of a terminal. The vehicular moving relay may repeatedly transmit data to a vehicular moving terminal without requesting a handover from a macro base station to the vehicular moving relay, using a unique code that is allocated to the vehicular moving terminal from the macro base station.

17 Claims, 12 Drawing Sheets

(56) References Cited

U.S. PATENT DOCUMENTS

| | | | | |
|---|---|---|---|---|
| 2009/0197624 A1* | 8/2009 | Kwak | ............... | H04W 72/0406 455/517 |
| 2009/0221288 A1* | 9/2009 | Zhang et al. | ................... | 455/434 |
| 2010/0088751 A1* | 4/2010 | Ando | ................... | H04W 8/065 726/5 |
| 2010/0120392 A1* | 5/2010 | Youn | ................... | H04B 7/2606 455/404.1 |
| 2010/0135210 A1* | 6/2010 | Kim | ........................ | H04L 1/06 370/328 |
| 2010/0150034 A1* | 6/2010 | Song | ................... | H04B 7/2606 370/279 |
| 2010/0184369 A1* | 7/2010 | Cho | ................... | H04B 7/15557 455/11.1 |
| 2010/0302999 A1* | 12/2010 | Hui et al. | ...................... | 370/315 |
| 2011/0201354 A1* | 8/2011 | Park | .................... | H04W 84/047 455/456.1 |
| 2011/0212731 A1* | 9/2011 | Lee | ........................ | H04W 28/26 455/450 |
| 2012/0039195 A1* | 2/2012 | Jung et al. | ...................... | 370/252 |
| 2012/0093103 A1* | 4/2012 | Lee | ........................ | H04L 5/0053 370/329 |
| 2012/0230249 A1* | 9/2012 | Fukumoto | ............. | H04W 52/46 370/315 |

FOREIGN PATENT DOCUMENTS

| | | | |
|---|---|---|---|
| KR | 10-2009-0010582 | 1/2009 | |
| KR | 10-2009-0046579 | 5/2009 | |
| KR | 10-2010-0016574 | 2/2010 | |
| KR | 10-2010-0064304 | 6/2010 | |
| WO | WO2010/095888 A2 * | 8/2010 | ............ H04W 36/08 |

* cited by examiner

COMMUNICATION METHOD OF A MACRO BASE STATION, A VEHICULAR MOVING RELAY, AND A VEHICULAR MOVING TERMINAL

CROSS-REFERENCE TO RELATED APPLICATION(S)

This application claims the benefit under 35 U.S.C. §119 (a) of Korean Patent Application No. 10-2010-0111399, filed on Nov. 10, 2010, in the Korean Intellectual Property Office, the entire disclosure of which is incorporated herein by reference for all purposes.

BACKGROUND

1. Field

The following description relates to a communication method for a vehicular moving terminal, a vehicular moving relay, and a macro base station in a communication system that includes the vehicular moving relay.

2. Description of Related Art

Users desire to select a communication network depending on mobility and a guaranteed quality of service in heterogeneous wireless network environments. Studies have recently been conducted on ways to improve performance using a mobile relay, for example, a vehicular moving relay, positioned near a user terminal.

In an example in which a relay function is available, if a user range is set too narrow in a moving cell of the moving relay, for example, if a user's terminal is positioned only in a vehicle, the moving relay may not provide services to adjacent terminals, and thus opportunity costs may be wasted.

Conversely, if the user range is set too wide in the moving cell of the moving relay, signaling overhead as well as, interference due to continuous handovers of various terminals positioned on roads or pavements may increase.

For example, if the moving relay is a repeater that is operating in layer 3 (L3) mode, a handover may be frequently requested so that the relay may support a neighboring vehicular moving terminal. If the neighboring vehicular moving terminal is served only by a macro base station, the performance of the moving terminal may drastically deteriorate on boundary areas of a cell. As another example, if the moving relay is a repeater operating in layer 1 (L1) mode, interference with other terminals supported by a neighboring macro base station may occur.

SUMMARY

In one general aspect, there is provided a communication method of a vehicular moving terminal in a communication system including a vehicular moving relay, the method including checking a quality of a communication service provided to the vehicular moving terminal, requesting a macro base station to allocate a unique code of the vehicular moving terminal based on the quality of the communication service, broadcasting the unique code to at least one vehicular moving relay and the macro base station to search for the at least one vehicular moving relay in a mode to repeat data to the vehicular moving terminal without requesting a handover from the macro base station, and combining data received from the macro base station and data repeated by the at least one vehicular moving relay.

The checking may comprise checking the quality of the communication service by comparing the quality of the communication service with a strength of a signal received by the vehicular moving terminal from the macro base station or the quality of a service based on information about a subscriber of the vehicular moving terminal.

The method may further comprise receiving information about the unique code and a wireless resource of the vehicular moving terminal corresponding to the unique code, from the macro base station.

The method may further comprise measuring the strength of a signal received from the macro base station, comparing the strength of the signal received from the macro base station with a preset threshold value, and stopping the broadcasting of the unique code so that the at least one vehicular moving relay stops repeating the data based on a result of the comparison.

The method may further comprise driving a timer from a time at which the at least one vehicular moving relay repeats the data, and stopping the broadcasting of the unique code so that the at least one vehicular moving relay stops repeating the data as the timer terminates.

In another aspect, there is provided a communication method of a vehicular moving relay, the method including receiving a unique code allocated to a vehicular moving terminal and information about a wireless resource of the vehicular moving terminal corresponding to the unique code, from a macro base station, determining whether to repeat data to the vehicular moving terminal without requesting a handover from the macro base station using the unique code broadcasted from the vehicular moving terminal, and repeating the data to the vehicular moving terminal in response to determining to repeat data.

The method may further comprise stopping the repeating of the data to the vehicular moving terminal as the vehicular moving terminal stops broadcasting the unique code.

The method may further comprise driving a timer from a time at which it is determined to repeat data, and stopping the repeating of the data to the vehicular moving terminal as the timer terminates.

The determining may comprise determining whether to repeat the data to the vehicular moving terminal based on at least one of a result of comparison of a preset threshold value with strength of a received signal of the unique code, an amount of wireless resources available to the vehicular moving relay, and information about a subscriber of the vehicular moving terminal.

The method may further comprise determining whether the vehicular moving relay repeats the data to a vehicular moving terminal that is adjacent to the vehicular moving relay.

The determining whether to repeat the data to the adjacent vehicular moving terminal may comprise determining whether the vehicular moving relay operates in layer 3 (L3) mode in which a handover from the macro base station is requested or operates both in L3 mode and in layer 1 (L1) mode in which the vehicular moving relay repeats the data to the adjacent vehicular moving terminal without requesting the handover from the macro base station.

In another aspect, there is provided a communication method of a macro base station in a communication system including a vehicular moving relay, the method including receiving, from a vehicular moving terminal, a request for allocation of a unique code of the vehicular moving terminal, allocating the unique code of the vehicular moving terminal and a wireless resource of the vehicular moving terminal corresponding to the unique code, in response to the request, and transmitting information about the unique code and the wireless resource of the vehicular moving terminal corresponding to the unique code, in order to search for at least one vehicular moving relay in a mode to repeat data to the vehicular moving terminal without requesting a handover from the macro base station.

The wireless resource of the vehicular moving terminal for the unique code may comprise a wireless resource for a link between the macro base station and the vehicular moving terminal and a wireless resource for a link between the at least one vehicular moving relay and the vehicular moving terminal.

The allocating may comprise allocating a wireless resource with respect to a layer 3 (L3) mode prior to a wireless resource with respect to a layer 1 (L1) mode when the vehicular moving relay operates in L3 mode in which a handover from the macro base station is requested and in L1 mode in which the vehicular moving relay repeats the data to an adjacent vehicular moving terminal without requesting the handover from the macro base station.

In another aspect, there is provided a communication method of a macro base station in a communication system including a vehicular moving relay, the method including receiving information about a strength of a received signal from a vehicular moving terminal served by the macro base station and at least one vehicular moving relay, determining at least one vehicular moving relay to repeat data to the vehicular moving terminal based on the information about the strength of the received signal and information about a subscriber of the vehicular moving terminal, allocating a unique code of the vehicular moving terminal and a wireless resource of the vehicular moving terminal corresponding to the unique code, and transmitting information about the unique code and the wireless resource of the vehicular moving terminal corresponding to the unique code in order to search for at least one vehicular moving relay in a mode to repeat data to the vehicular moving terminal without requesting a handover from the macro base station.

In another aspect, there is provided a communication method of a macro base station in a communication system including a vehicular moving relay, the method including receiving information about a strength of a received signal from a vehicular moving terminal served by the macro base station and at least one vehicular moving relay, determining at least one vehicular moving relay to repeat data to the vehicular moving terminal based on the information about the strength of the received signal and information about a subscriber of the vehicular moving terminal, and requesting the at least one vehicular moving relay to repeat the data to the vehicular moving terminal.

In another aspect, there is provided a communication method of a vehicular moving relay in a communication system including the vehicular moving relay, the method including receiving, from a macro base station, a request for repeating data to a vehicular moving terminal, determining whether to repeat the data to the vehicular moving terminal without requesting a handover from the macro base station, in response to the request, and repeating data received from the macro base station to the vehicular moving terminal.

The method may further comprise driving a timer from a time at which it is determined to repeat data, and stopping the repeating of the data to the vehicular moving terminal as the timer terminates.

The determining may comprise determining whether to support the vehicular moving terminal based on information about strength of a received signal of the vehicular moving terminal and information about a subscriber of the vehicular moving terminal.

In another aspect, there is provided a computer-readable storage medium having stored therein program instructions to cause a processor to implement a method including checking a quality of a communication service provided to the vehicular moving terminal, requesting a macro base station to allocate a unique code of the vehicular moving terminal based on the quality of the communication service, broadcasting the unique code to at least one vehicular moving relay and the macro base station to search for the at least one vehicular moving relay in a mode to repeat data to the vehicular moving terminal without requesting a handover from the macro base station, and combining data received from the macro base station and data repeated by the at least one vehicular moving relay.

In another aspect, there is provided a mobile terminal served by a macro base station, the mobile terminal including a controller to determine whether a quality of service (QoS) of a signal provided by the macro base station has dropped below a threshold level, and a communication unit to transmit a request to the macro base station indicating the QoS of the signal has dropped below the threshold level, to receive code from the macro base station, to establish a connection with a vehicular moving relay, and to simultaneously receive the signal from the macro base station and the vehicular moving relay without performing a handover to the vehicular moving relay.

The controller may combine the signal received from the macro base station and the signal received from the vehicular moving relay to generate a received signal.

The communication unit may comprise a transmitter and a receiver to communicate with the macro base station and the vehicular moving relay.

In response to receiving the signal from the macro base station and the vehicular moving relay, the controller may combine the received signals and determine whether the QoS policy has risen above the threshold level.

Other features and aspects may be apparent from the following detailed description, the drawings, and the claims.

Figure 1:
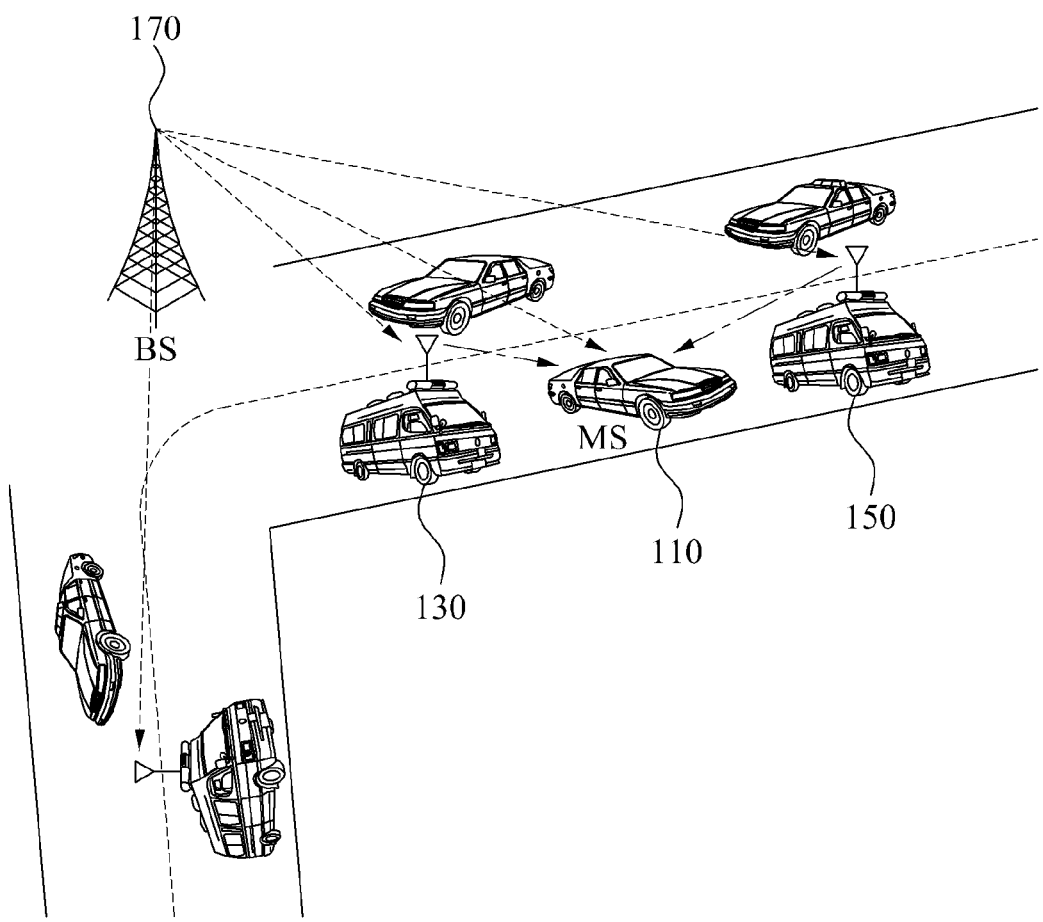
FIG. 1 is a diagram illustrating an example of a communication environment for communication between a vehicular moving terminal, a vehicular moving relay, and a macro base station in a communication system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

In the following description, a "vehicular moving terminal" includes, for example, a communication terminal that is installed in a vehicle, a communication terminal that is carried or worn by a user in a vehicle, and any type of user equipment that is capable of functioning similarly. For example, the vehicular moving terminal includes a cellular phone, a personal computer, a smart phone, a notebook, a tablet, an MP3 player, and the like.

In various aspects, a "vehicular moving relay" may provide communication services to a vehicular moving terminal, and may form a link with a macro base station and the vehicular moving terminal. The vehicular moving relay may target any type of vehicles which have a relay function but which do not include a moving relay, for example, a train, a subway, a bus, a gondola, or the like.

As described herein, the vehicular moving relay may be classified into a layer 3 (L3) mode and a layer 1 (L1) mode. In the L3 mode the vehicular moving relay may request a handover of a vehicular moving terminal from a macro base station in order to provide a relay service to the vehicular moving terminal. In the L1 mode the vehicular moving relay may repeat data to an adjacent vehicular moving terminal without requesting a handover from a macro base station. The L1 mode may function as a repeater which simply re-transmits data.

FIG. 1 illustrates an example of a communication environment for communication between a vehicular moving terminal, a vehicular moving relay, and a macro base station in a communication system.

Referring to FIG. 1, the communication system includes a vehicular moving terminal 110, vehicular moving relays 130 and 150, and a macro base station 170 in a heterogeneous cellular environment.

For example, the heterogeneous cellular environment may be a wireless environment in which a Wireless Metropolitan Access Network (WMAN), a Wireless Local Access Network (WLAN), and the vehicular moving relays 130 and 150 are mixed.

The vehicular moving terminal 110 may be provided with a service from the vehicular moving relays 130 and 150 and/or the macro base station 170.

The vehicular moving relays 130 and 150 may support resources to the corresponding vehicular moving terminal 110 in order to operate in L3 mode and to perform an L1 mode operation in response to receiving a request from the vehicular moving terminal 100 or the macro base station 170.

The vehicular moving relays 130 and 150 may be connected to the macro base station 170 through a wireless backhaul.

The macro base station 170 may operate as a serving base station of the vehicular moving terminal 100 while the vehicular moving relays 130 and 150 perform the L1 mode operation. In this example, a handover to the corresponding vehicular moving relays 130 and 150 does not occur.

The vehicular moving terminal 110 may be traveling on a road in an environment illustrated in FIG. 1 and the vehicular moving terminal 110 may frequently join and leave a cell that is formed by adjacent vehicular moving relays 130 and 150, for example, depending on a traveling direction and a traveling speed.

If a relay service for the vehicular moving terminal 110 performs a handover each time the vehicular moving terminal 110 leaves and joins the cell, overall performance of the communication system may decrease and signaling overhead may increase.

Therefore, in order to prevent a decrease in performance and an increase in overhead, and to serve data of the vehicular moving terminal 110, the vehicular moving relays 130 and 150 may repeat the data to the vehicular moving terminal 110 without performing a handover whenever necessary.

Figure 2:
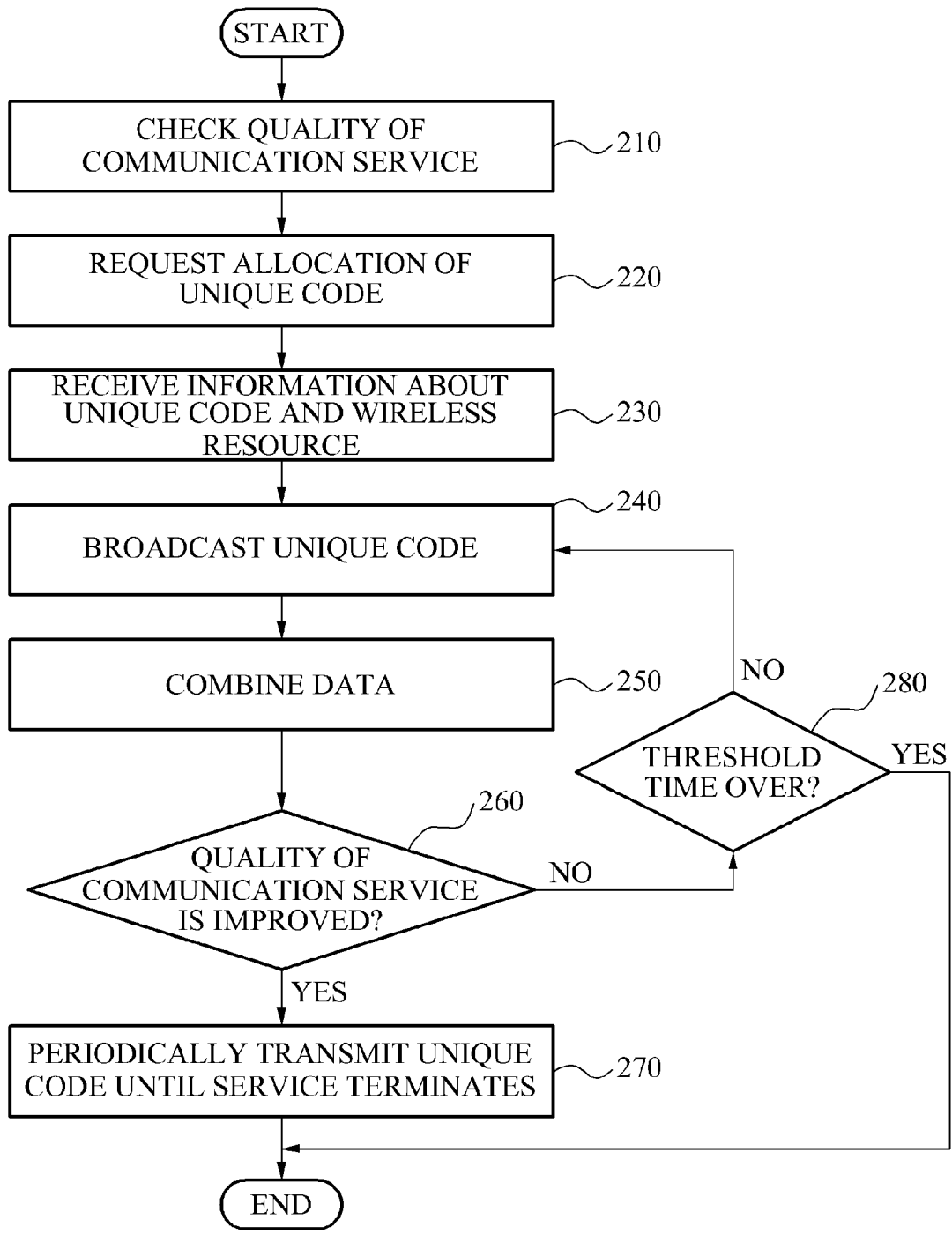
FIG. 2 is a flowchart illustrating an example of a communication method of a vehicular moving terminal in a communication system including a vehicular moving relay.

FIG. 2 illustrates an example a communication method of a vehicular moving terminal in a communication system including a vehicular moving relay.

Referring to FIG. 2, the vehicular moving terminal checks a quality of a communication service that is provided to the vehicular moving terminal from a macro base station or a serving apparatus, in 210.

In 210, the vehicular moving terminal may check the quality of the communication service that is provided to the vehicular moving terminal based on strength of a signal that is received from the macro base station. For example, the quality of the communication service may be based on a received signal strength indicator, a result of comparison of the quality of the communication service with quality of a service based on information about a subscriber of the vehicular moving terminal, and the like.

In 210, the vehicular moving terminal may identify whether to improve the quality of the communication service that is provided to the vehicular moving terminal. In response to determining to improve the quality of service, the vehicular moving terminal may request, from the macro base station, a unique code that is used to request an improvement in the service.

For example, a subscriber of the vehicular moving terminal may subscribe to a premium service. If the quality of a communication service provided to the vehicular moving terminal does not meet the quality of the premium service, the vehicular moving terminal may measure a strength of a received signal, from the macro base station serving the vehicular moving terminal, to identify that the service quality has deteriorated. If a high-quality service is requested by a user, the vehicular moving terminal may identify that the currently used communication service has deteriorated in performance and an improvement in quality may be performed.

The vehicular moving terminal requests the macro base station to allocate a unique code of the vehicular moving terminal based on the quality of the communication service, in 220. For example, the vehicular moving terminal may identify the deterioration in the quality of the communication service, and request the unique code from the macro base station to request an improved communication service. For example, the unique code may be a ranging code.

The vehicular moving terminal receives information about the unique code and a wireless resource of the vehicular moving terminal for the unique code from the macro base station, in 230.

The vehicular moving terminal broadcasts the unique code to at least one vehicular moving relay and the macro base station, in 240. For example, the unique code may be used to search for the at least one vehicular moving relay in a mode that repeats data to the vehicular moving terminal without requesting a handover from the macro base station to the vehicular moving relay.

The vehicular moving terminal may broadcast the unique code to form a virtual cell based on the vehicular moving terminal with respect to an area influenced by the unique code. For example, the vehicular moving terminal may broadcast the unique code to vehicular moving relays that are adjacent to the traveling vehicular moving terminal in order to improve the quality of the communication service. For example, the broadcasting may be performed periodically.

In 220, if the wireless resource of the vehicular moving terminal for the unique code is unconditionally allocated even if there is no adjacent vehicular moving relay to the vehicular moving terminal, wireless resources may be wasted. Thus, in 240, the vehicular moving terminal may broadcast the unique code only when the existence of an adjacent vehicular moving relay is identified. In this example, whether the adjacent vehicular moving relay exists may be identified by a preamble signal or information that is received from the macro base station.

The vehicular moving terminal combines data received from the macro base station with the data that is being repeated by the at least one vehicular moving relay, in 250.

For example, the vehicular moving relay may repeatedly relay data to the vehicular moving terminal without requesting a handover from the macro base station to the vehicular moving relay. Accordingly, even though the vehicular moving relay performs the data repeating, the vehicular moving terminal may also receive a signal or data from the macro base station. That is, the vehicular moving relay may simultaneously receive the repeated signal by the vehicular moving relay and a signal from the macro base station. For example, the vehicular moving terminal may first receive the signal or data from the macro base station, and subsequently receive a signal from the vehicular moving relay, and may combine the two signals into a single signal. As another example, the signals may be received in reverse order, and the same procedure may be performed. In this example, the signal received from the macro base station and the signal received from the vehicular moving relay may be the same signal or different signals.

The vehicular moving terminal determines whether the quality of the communication service has improved through the processes of 240 and 250, in 260. If the communication service has improved, the vehicular moving terminal periodically transmits the unique code to the at least one vehicular moving relay and the macro base station until the communication service terminates, in 270. In this example, the quality of the communication service may be compared to a quality value to determine whether the quality satisfies the quality value.

If the quality of the communication service provided to the vehicular moving terminal is not satisfied in 260, the vehicular moving terminal determines whether a threshold time has lapsed, in 280. If the threshold time has not lapsed, the vehicular moving terminal repeats operations 240, 250, and 260. If the threshold time has lapsed, the vehicular moving terminal terminates the operation, in 280. For example, the threshold time may be a termination time of a timer.

In 270, the vehicular moving terminal transmits the unique code until the service being repeated by the vehicular moving relay terminates.

Various methods may be used to determine a termination time of the data that is repeating from the vehicular moving relay. For example, the vehicular moving terminal may use a strength of a signal received from the macro base station, for example, an RSSI, described in the example of FIG. 5, and a method of terminating the service after a predetermined period of time using a timer of the vehicular moving terminal, as described in FIG. 6.

Figure 7:
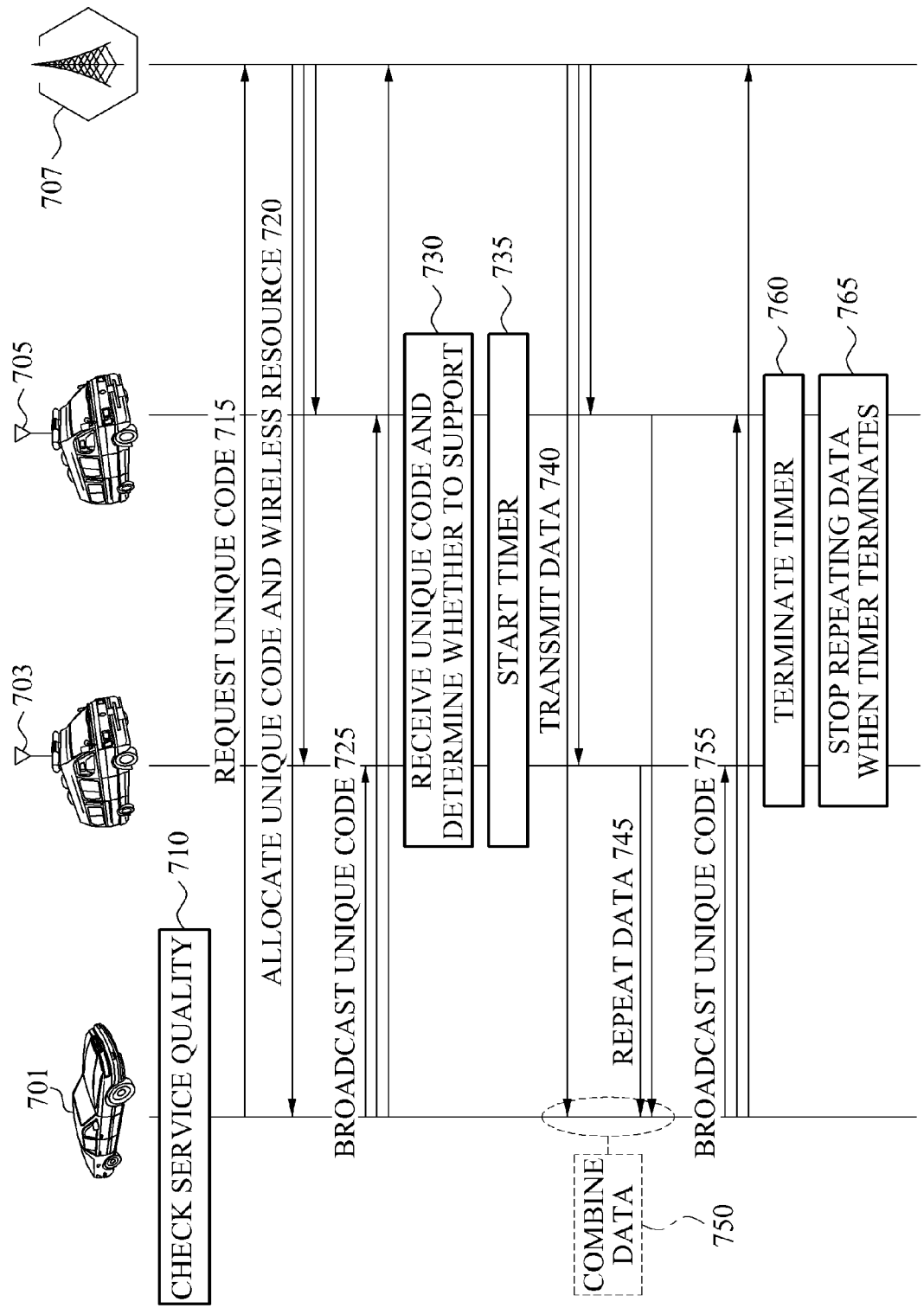
FIG. 7 is a diagram illustrating an example of a process for stopping data from repeating using a timer of a vehicular moving relay.
Figure 10:
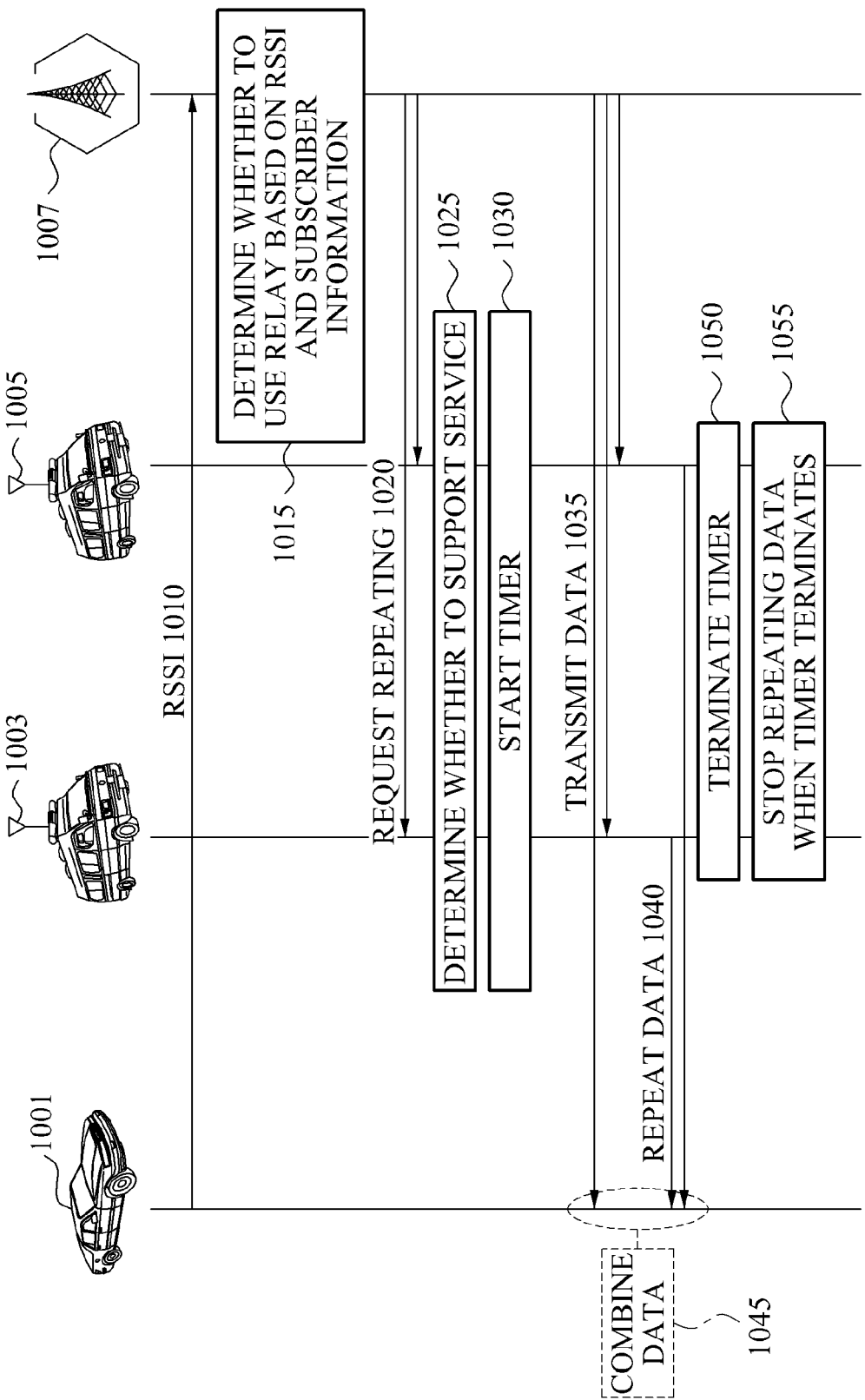
FIG. 10 is a diagram illustrating an example of a process in which a macro base station determines whether to use a vehicular moving relay and at least one vehicular moving relay stops data from repeating using a timer.

As another example, the at least one vehicular moving relay may use a method of terminating data from repeating when a timer of the vehicular moving relay terminates, as illustrated in the examples of FIGS. 7 and 10.

A method of determining the termination time of the data repeating of the vehicular moving relay is further described herein.

Figure 3:
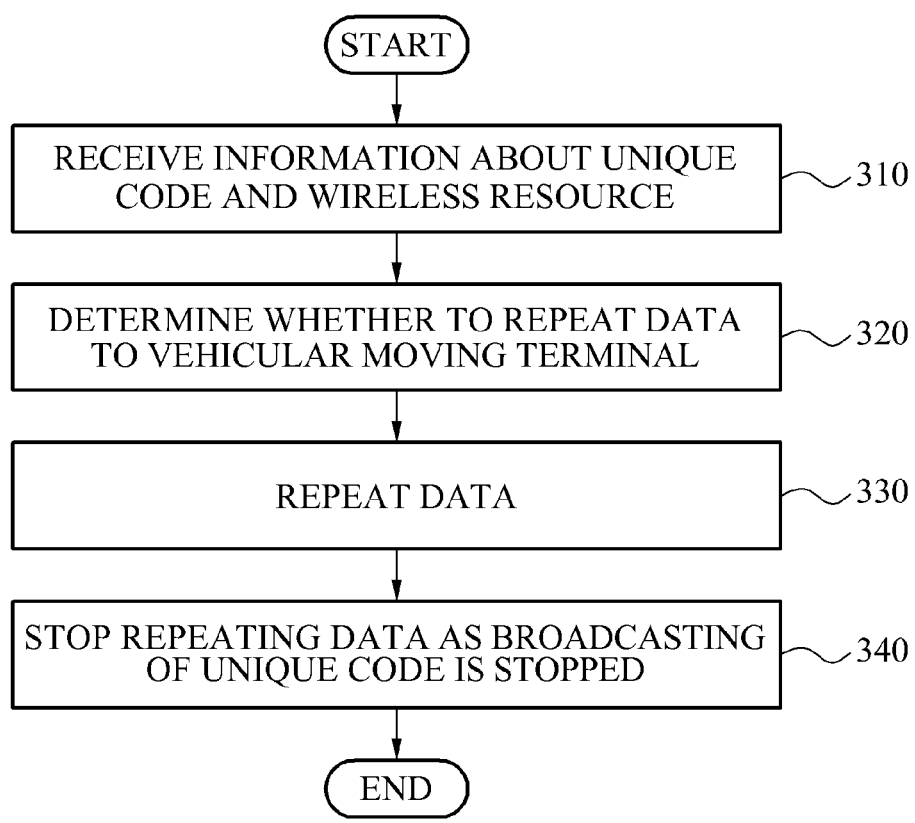
FIG. 3 is a flowchart illustrating an example of a communication method of a vehicular moving relay.

FIG. 3 illustrates an example of a communication method of a vehicular moving relay.

Referring to FIG. 3, the vehicular moving relay receives, from a macro base station, a unique code allocated to a vehicular moving terminal and information about a wireless resource of the vehicular moving terminal corresponding to the unique code, in 310. The vehicular moving relay may store the unique code allocated to the vehicular moving terminal and the information about the wireless resource of the vehicular moving terminal corresponding to the unique code. The vehicular moving relay may identify that the vehicular moving terminal needs an improvement in quality of a communication service through the reception of the unique code.

Upon receiving the unique code of the vehicular moving terminal, the vehicular moving relay identifies that vehicular moving terminals exist in a neighboring area. The vehicular moving relay may select a vehicular moving terminal to repeatedly provide data to from among the adjacent vehicular moving terminals. For example, the vehicular moving relay may use a method of selecting a vehicular moving terminal, having a strength of a received signal that is greater than or equal to a predetermined threshold value.

The vehicular moving relay determines whether to repeat data to the vehicular moving terminal using the unique code broadcasted by the vehicular moving terminal, in 320.

In 320, the vehicular moving relay may determine whether to repeat data to the vehicular moving terminal based on at least one of a comparison of a received signal strength of the unique code with a preset threshold value, an amount of wireless resources available to the vehicular moving relay, and information about a subscriber of the vehicular moving terminal.

If the strength of the received signal of the unique code received from the vehicular moving terminal is less than a preset threshold value, the vehicular moving terminal may not be close enough to the vehicular moving relay to receive the repeated data from the vehicular moving relay. In this example, if the strength of the received signal of the unique code is smaller than the preset threshold value, the vehicular moving relay may determine not to repeat the data to the vehicular moving terminal. The determination enables the vehicular moving terminal to receive the repeated data from another vehicular moving relay that is positioned more closely than the vehicular moving relay or the macro base station.

As another example, if the strength of the signal of the unique code received from the vehicular moving terminal is high enough to satisfy the preset threshold value, but the amount of the wireless resources available to the vehicular moving relay is insufficient, the vehicular moving relay may determine not to repeat the data to the corresponding vehicular moving terminal. In this example, the amount of the wireless resources may be insufficient if other vehicular moving terminals which the vehicular moving relay currently serves or repeats data to use a great amount of wireless resources so that amount of wireless resources provided to a new vehicular moving terminal is insufficient.

As another example, the vehicular moving relay may determine whether to repeat the data to the vehicular moving terminal based on information about a subscriber of the vehicular moving terminal. For example, if the information about the subscriber of the vehicular moving terminal represents a customer who is the more urgently provided with the repeated data or a customer that is provided with a premium service, the vehicular moving relay may determine to repeat the data to the corresponding vehicular moving terminal prior to other vehicular moving terminals that are also currently being served by the vehicular moving relay.

In response to the vehicular moving relay determining to repeat the data to the vehicular moving terminal, the vehicular moving relay repeats data received from the macro base station to the vehicular moving terminal, in 330.

In 330, the vehicular moving relay may repeat or retransmit the data transmitted from the macro base station to an adjacent vehicular moving terminal. For example, the vehicular moving relay may use a reserved wireless resource, that is, a wireless resource of the vehicular moving terminal for a corresponding unique code that is received from the macro base station.

If the data is repeated, the vehicular moving relay does not request a handover of the vehicular moving terminal from the macro base station to the vehicular moving relay but simply repeats or retransmits the data to the vehicular moving terminal.

The vehicular moving relay stops repeating the data to the vehicular moving terminal if the vehicular moving terminal stops broadcasting the unique code, in 340. Examples for the vehicular moving relay to stop repeating the data to the vehicular moving terminal are described with reference to FIGS. 5 to 7.

Figure 4:
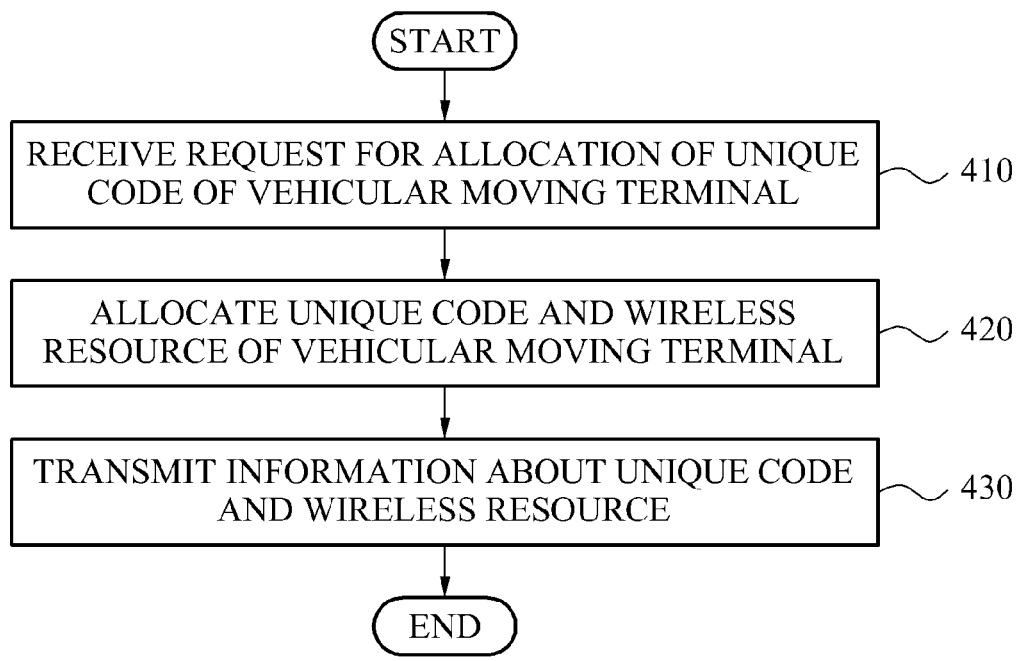
FIG. 4 is a flowchart illustrating an example of a communication method of a macro base station in a communication system including a vehicular moving relay.

FIG. 4 illustrates an example of a communication method of a macro base station in a communication system including a vehicular moving relay.

Referring to FIG. 4, the macro base station receives a request for allocation of a unique code from a vehicular moving terminal, in 410. The macro base station may identify that the vehicular moving terminal desires an improvement in quality of a communication service through the request for the allocation of the unique code from the vehicular moving terminal.

The macro base station allocates the unique code of the vehicular moving terminal and a wireless resource of the vehicular moving terminal associated with the unique code, in response to the request for the allocation of the unique code, in 420. For example, the macro base station may allocate the wireless resource to support the vehicular moving terminal that desires the improvement in the quality of the communication service.

In various aspects, a wireless resource of the vehicular moving terminal for the unique code may include a wireless resource for a link between the macro base station and the vehicular moving terminal and a wireless resource for a link between at least one vehicular moving relay and the vehicular moving terminal.

In 420, if the vehicular moving relay operates in an L3 mode in which a handover from the macro base station is requested and in an L1 mode in which data is repeated to an adjacent vehicular moving terminal without a request for a handover from the macro base station, the macro base station may allocate a wireless resource with respect to the L3 mode prior to a allocating a wireless resource with respect to the L1 mode. An example of a frame with respect to a wireless resource allocated by the macro base station to the vehicular moving relay is further described with reference to FIG. 11.

Because the wireless resource is allocated based on the request of the vehicular moving terminal, the wireless resource may be wasted if there is no vehicular moving relay in an adjacent area to the vehicular moving terminal. In order to prevent the waste of the wireless resource, the macro base station may allocate the wireless resource with respect to the unique code to the vehicular moving terminal only if the unique code broadcasted from the vehicular moving terminal is identified.

For example, the macro base station may allocate the wireless resource for the vehicular moving terminal only if the vehicular moving terminal receives the unique code requesting data repeating with respect to the vehicular moving relay.

The macro base station may send a query to the vehicular moving terminal that indicates whether allocation of a wireless resource is desired. In response to the query, the vehicular moving terminal may reply to the macro base station about a time at which the allocation of the wireless resource is desired or whether the allocation of the wireless resource is desired. The macro base station may efficiently allocate the wireless resource using the replied information from the vehicular moving terminal.

The macro base station transmits information about the unique code and the wireless resource of the vehicular moving terminal for the unique code to the vehicular moving terminal and at least one vehicular moving relay positioned in an area of the macro base station serving the vehicular moving terminal, in 430.

For example, the unique code may be code for the vehicular moving terminal to search for at least one vehicular moving relay in mode to perform data repeating without a request for a handover from the macro base station.

Figure 5:
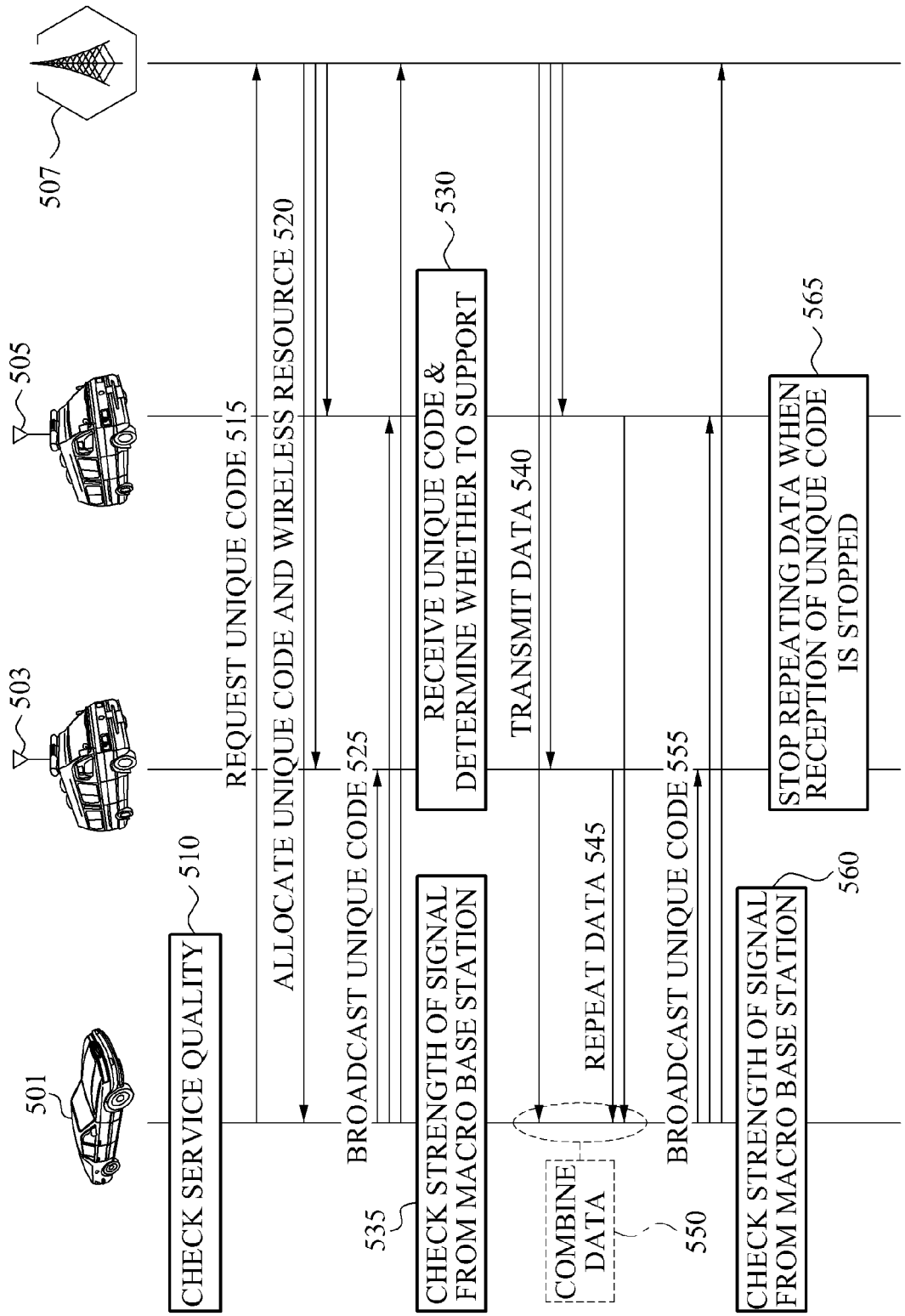
FIG. 5 is a diagram illustrating an example of a process for stopping data from repeating based on a change in strength of a signal of a macro base station.

FIG. 5 illustrates an example of a process for stopping data from repeating based on a change in strength of a signal of a macro base station.

Referring to FIG. 5, the communication system includes a vehicular moving terminal 501, vehicular moving relays 503 and 505, and the macro base station 507.

The vehicular moving terminal 501 checks the quality of a communication service provided to the vehicular moving terminal 501, in 510, and requests the macro base station 507 to allocate a unique code of the vehicular moving terminal 501 if an improvement in the quality of the communication service is determined, in 515.

The macro base station 507 allocates the unique code and a wireless resource of the vehicular moving terminal 501 for the unique code to the vehicular moving terminal 501 in response to the request for the allocation of the unique code, in 520. In 520, the macro base station may transmit the unique code to the vehicular moving terminal 501. The macro base station may also transmit the unique code to one or more of the vehicular moving relays 503 and 505.

The vehicular moving terminal 501 broadcasts the received unique code to at least one vehicular moving relay 503 or 505 and the macro base station 507, in 525. For example, the at least one vehicular moving relay 503 or 505 may be a vehicular moving relay may be positioned in a macro cell of the macro base station 507 and may be adjacent to the vehicular moving terminal 501.

The at least one vehicular moving relay 503 or 505 determines whether to provide or support data repeating to the vehicular moving terminal 501, without requesting a handover from the macro base station 507, based on the unique code that is broadcasted from the vehicular moving terminal 501, in 530.

The vehicular moving terminal 501 checks the strength of a signal received from the macro base station 507, in 535. For example, the vehicular moving terminal 501 may compare the strength of the signal that is received from the macro base station 507 with a preset threshold value. Based on the comparison, the vehicular moving terminal 501 may stop broadcasting the unique code to stop the at least one vehicular moving relay 503 or 505 from repeating data transmission.

The vehicular moving terminal 501 receives data from the macro base station 507, in 540, receives data repeated by the at least one vehicular moving relay 503 or 505, in 545, and combines the two data, in 550.

In this example, the at least one vehicular moving relay 503 or 505 performs the data repeating, without requesting a handover from the macro base station 507. Thus, the vehicular moving terminal 501 may continue to receive a signal from the macro base station 507 and also receive a signal that is repeated from at least one of the vehicular moving relays 503 and 505.

Accordingly, when a signal or data is first received from the macro base station 507 and a signal is subsequently received from the at least one vehicular moving relay 503 or 505, the two signals may be combined. In this example, the signal received from the macro base station 507 and the signal received from the at least one vehicular moving relay 503 or 505 may be the same signal or may be different signals.

After the data is combined, the vehicular moving terminal 501 periodically broadcasts the unique code to the at least one vehicular moving relay 503 or 505 and the macro base station 507 until the service terminates, in 555.

In 560, the vehicular moving terminal 501 checks the strength of the signal received from the macro base station 507 in the same manner as in operation 535. As a result in operation 560, if the strength of the signal received from the macro base station 507 is equal to or greater than a preset threshold value, the vehicular moving terminal 501 stops broadcasting the unique code so that the at least one vehicular moving relay 503 or 505 stops data repeating.

In 560, if the strength of the signal received from the macro base station 507 is equal to or greater than the preset threshold the communication service provided from the macro base station 507 satisfies a desired quality of service, and thus, it is favorable for the vehicular moving terminal 501 to receive data directly from the macro base station 507.

In 565, the at least one vehicular moving relay 503 or 505 stops data repeating to the vehicular moving terminal 501 as the vehicular moving terminal 501 stops broadcasting the unique code.

Figure 6:
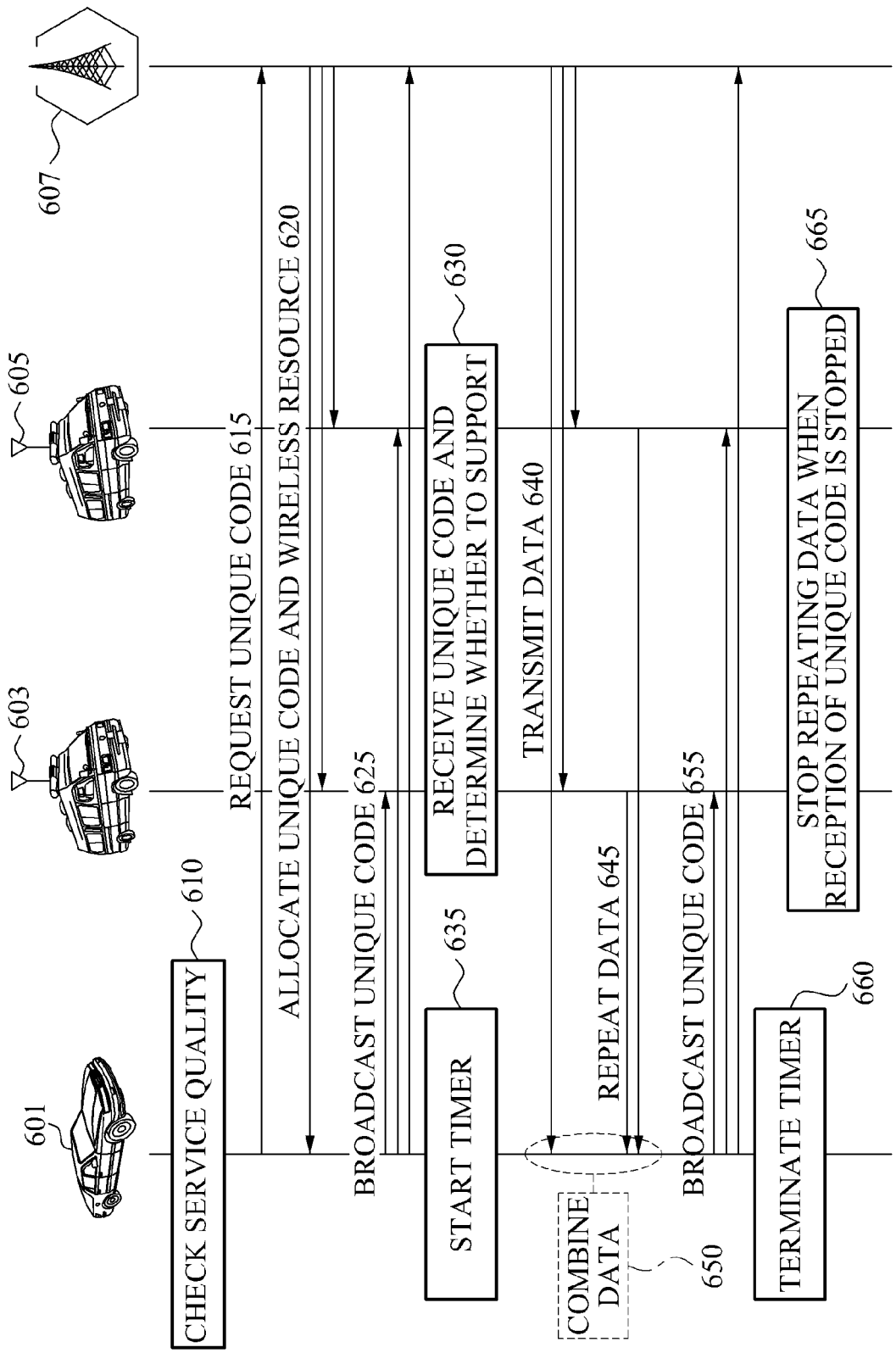
FIG. 6 is a diagram illustrating an example of a process stopping data from repeating using a timer of a vehicular moving terminal.

FIG. 6 illustrates an example of a process for stopping data from repeating using a timer of a vehicular moving terminal.

Referring to FIG. 6, the communication system includes a vehicular moving terminal 601, vehicular moving relays 603 and 605, and a macro base station 607. Operations 610 to 630 of FIG. 6 are the same as operations 510 to 530 of FIG. 5, and thus, additional descriptions thereof are omitted for clarity and conciseness.

In 630, after at least one vehicular moving relay 603 or 605 determines to provide or support data repeating to the vehicular moving terminal 601, the vehicular moving terminal 601 starts driving the timer from the time at which the at least one vehicular moving relay 603 or 605 performs data repeating, in 635. The vehicular moving terminal 601 drives the timer in order to determine a time when a service provided from the at least one vehicular moving relay 603 or 605, terminates.

While the timer is driven, the vehicular moving terminal 601 receives data from the macro base station 607, in 640, receives data repeated by the at least one vehicular moving relay 603 or 605, in 645, and combines the data, in 650.

The vehicular moving terminal 601 periodically broadcasts the unique code to the at least one vehicular moving relay 603 or 605 and the macro base station 607 until the service terminates, in 655.

The vehicular moving terminal 601 stops broadcasting the unique code in response to the timer terminating, in 660.

The at least one vehicular moving relay 603 or 605 stops data repeating to the vehicular moving terminal 601, in 665, as the vehicular moving terminal 601 stops broadcasting the unique code.

FIG. 7 illustrates an example of a process for stopping data from repeating using a timer of a vehicular moving relay.

Referring to FIG. 7, the communication system includes a vehicular moving terminal 701, vehicular moving relays 703 and 705, and a macro base station 707. Operations 710 to 730 of FIG. 7 are the same as operations 510 to 530 of FIG. 5, and thus, additional descriptions thereof are omitted for clarity and conciseness.

At least one vehicular moving relay 703 or 705 determines to repeat data to the vehicular moving terminal 701, in 730, and starts driving the timer from a time at which the at least one vehicular moving relay 703 or 705 determines to provide data repeating, in 735.

In 735, the at least one vehicular moving relay 703 or 705 may drive the timer in order to determine a time at which a service provided from the at least one vehicular moving relay 703 or 705, terminates.

While the timer is driven, the vehicular moving terminal 701 receives data from the macro base station 707, in 740, receives data repeated by the at least one vehicular moving relay 703 or 705, in 745, and combines the data, in 750.

The vehicular moving terminal 701 periodically broadcasts the unique code to the at least one vehicular moving relay 703 or 705 and the macro base station 707 until the service terminates, in 755.

The vehicular moving terminal 701 stops broadcasting the unique code in response to the timer terminating, in 760.

The at least one vehicular moving relay 703 or 705 stops data repeating to the vehicular moving terminal 701, in 765, as the vehicular moving terminal 701 stops broadcasting the unique code.

Figure 8:
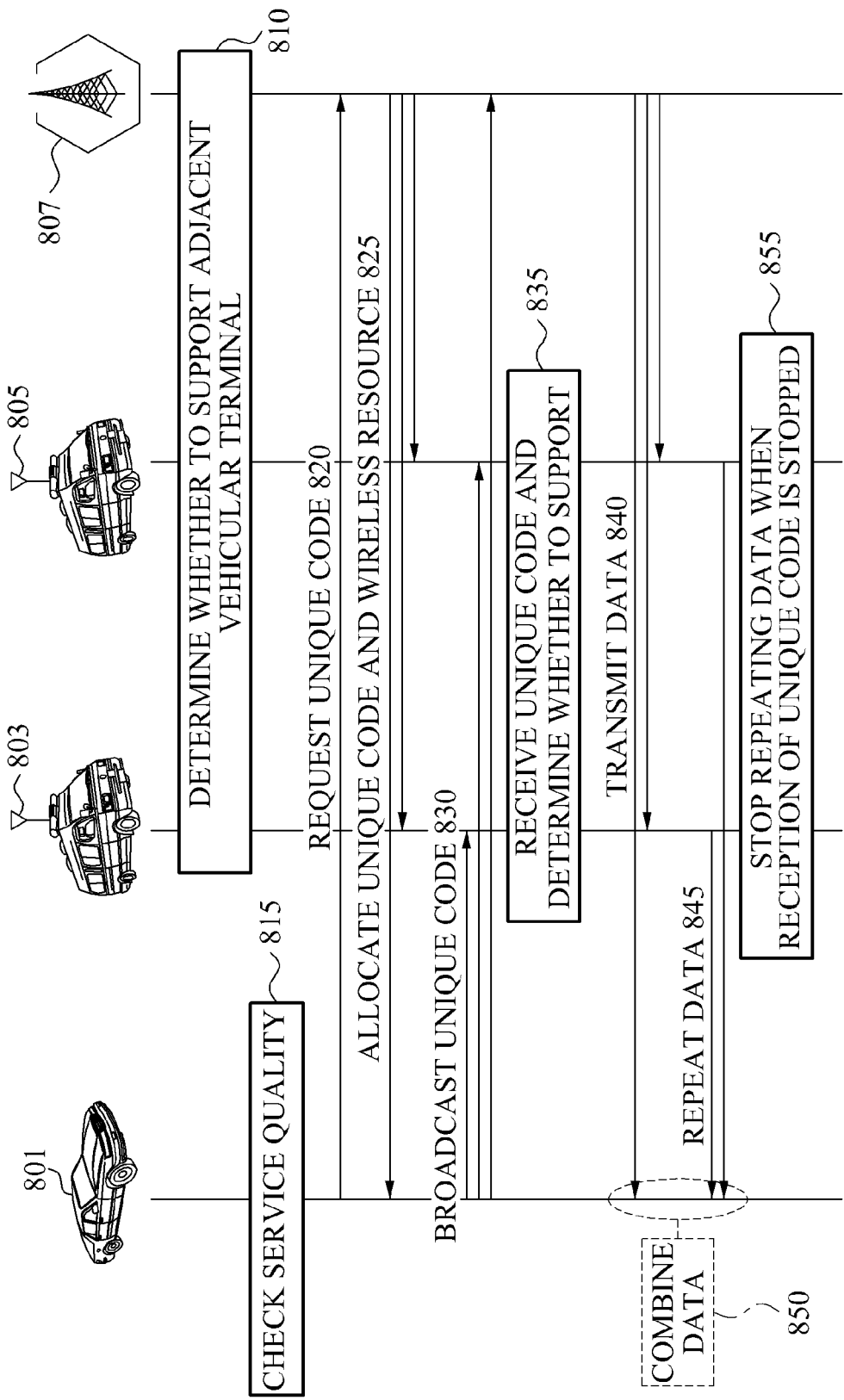
FIG. 8 is a diagram illustrating an example of a process for providing a relay service based on a type of a vehicular moving relay.

FIG. 8 illustrates an example of a process of providing a relay service based on a type of a vehicular moving relay.

Referring to FIG. 8, the communication system includes a vehicular moving terminal 801, at least one vehicular moving relay 803 or 805, and a macro base station 807.

The at least one vehicular moving relay 803 or 805 and the macro base station 807 determine whether the at least one vehicular moving relay 803 or 805 supports an adjacent vehicular moving terminal 801, in 810. In this example, the determining may comprise determining whether one or more of the vehicular moving relays 803 or 805 may repeatedly broadcast data to the adjacent vehicular moving terminal 801.

In 810, the at least one vehicular moving relay 803 or 805 and the macro base station 807 may determine whether the at least one vehicular moving relay 803 or 805 operates in L3 mode or operates simultaneously in L1 mode and in L3 mode.

As described above, a vehicular moving relay in an L1 mode may repeat data to the adjacent vehicular moving terminal 801 without requesting a handover from the macro base station 807 to the vehicular moving relay. A vehicular moving relay in an L3 mode may request a handover from the macro base station 807 to the vehicular moving relay in order to provide a service to the vehicular moving terminal 801.

For example, if the at least one vehicular moving relay 803 or 805 operates simultaneously in L1 mode and in L3 mode, the macro base station 807 may allocate a wireless resource for the L3 mode prior to a wireless resource for the L1 mode. The allocation of wireless resources is further described with reference to FIG. 11.

The vehicular moving terminal 801 checks quality of a communication service provided to the vehicular moving terminal 801, in 815, and requests the macro base station 807 to allocate a unique code in response to an improvement in the quality of the communication service being desired, in 820.

In 825, the macro base station 807 allocates the unique code and a wireless resource of the vehicular moving terminal 801 for the unique code to the vehicular moving terminal 801, in response to the request for the allocation of the unique code.

The vehicular moving terminal 801 broadcasts the received unique code to the at least one vehicular moving relay 803 or 805 and the macro base station 807, in 830. In this example, the at least one vehicular moving relay 803 or 805 may be a vehicular moving relay that is positioned in a macro cell of the macro base station 807 and that is adjacent to the vehicular moving terminal 801.

The at least one vehicular moving relay 803 or 805 determines to provide or support data repeating to the vehicular moving terminal 801, without requesting a handover from the macro base station 807, using the unique code broadcasted from the vehicular moving terminal 801, in 835.

In 835, for example, the at least one vehicular moving relay 803 or 805 may determine whether to repeat data to the vehicular moving terminal 801 based on at least one of a result of comparing the strength of a received signal of the unique code with a preset threshold value, an amount of a wireless resource available to the at least one vehicular moving relay 803 or 805, and information about a subscriber of the vehicular moving terminal 801.

For example, the at least one vehicular moving relay 803 or 805 may repeat the data to the adjacent vehicular moving terminal 801 if the strength of the received signal of the unique code is greater than the preset threshold value and the amount of the wireless resource available to the at least one vehicular moving relay 803 or 805 is sufficient.

The vehicular moving terminal 801 receives data from the macro base station 807, in 840, receives data repeated by the at least one vehicular moving relay 803 or 805, in 845, and combines the received signals, in 850.

The at least one vehicular moving relay 803 or 805 stops data repeating to the vehicular moving terminal 801 as the vehicular moving terminal 801 stops broadcasting the unique code, in 855.

Figure 9:
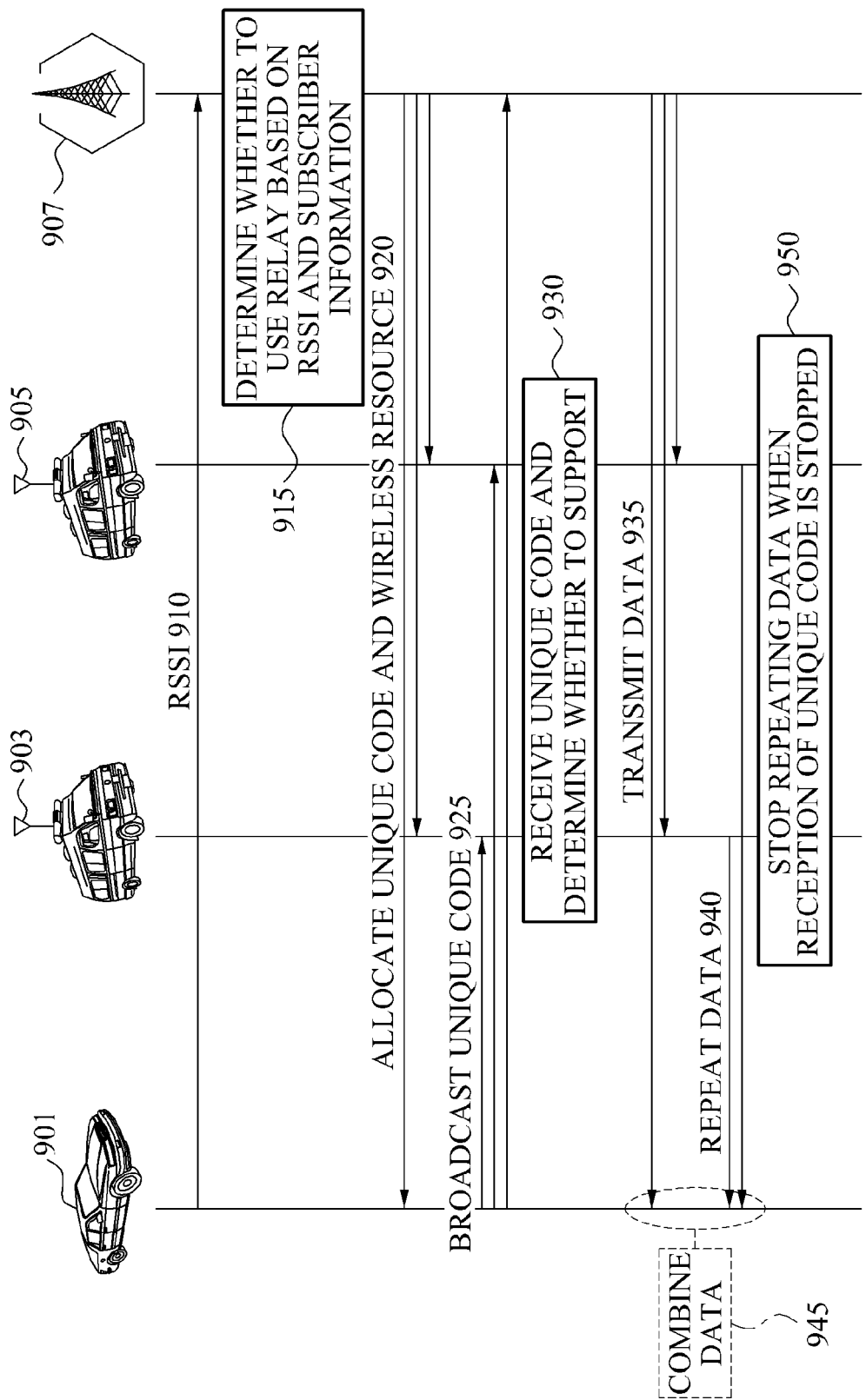
FIG. 9 is a diagram illustrating an example of a process of a macro base station determining whether to use a vehicular moving relay.

FIG. 9 illustrates an example of a process of a macro base station determining whether to use a vehicular moving relay.

Referring to FIG. 9, the communication system includes a vehicular moving terminal 901, vehicular moving relays 903 and 905, and a macro base station 907.

FIG. 5 illustrates an example in which a vehicular moving terminal autonomously checks service quality and requests a unique code from the macro base station, whereas FIG. 9 illustrates an example in which the macro base station 907 receives information about strength of a received signal from the vehicular moving terminal 901 served by the macro base station 907 and at least one vehicular moving relay 903 or 905, and allocates a unique code and a wireless resource to the vehicular moving terminal 901 based on the information.

The macro base station 907 receives the information about the strength of the received signal from the vehicular moving terminal 901, served by the macro base station 907 and the at least one vehicular moving relay 903 or 905, in 910. For example, the information about the strength of the received signal may be a RSSI.

The macro base station 907 determines at least one vehicular moving relay that is to repeat data to the vehicular moving terminal 901 based on the information about the strength of the received signal and information about a subscriber of the vehicular moving terminal 901, in 915.

The macro base station 907 transmits information about the unique code and the wireless resource of the vehicular moving terminal 901 for the unique code to the vehicular moving terminal 901 and the at least one vehicular moving relay 903 or 905 that are positioned in an area of the macro base station 907 serving the vehicular moving terminal 901, in 920. For example, the unique code may be code to search for the at least one vehicular moving relay 903 or 905 in a mode to perform data repeating without requesting a handover from the macro base station 907.

The vehicular moving terminal 901 broadcasts the received unique code to the at least one vehicular moving relay 903 or 905 and the macro base station 907, in 925. In 930, the at least one vehicular moving relay 903 or 905 determines whether to provide or support data repeating to the vehicular moving terminal 901 without requesting a handover from the macro base station 907, based on the unique code broadcasted from the vehicular moving terminal 901.

The vehicular moving terminal 901 receives data from the macro base station 907, in 935, receives data repeated by the at least one vehicular moving relay 903 or 905, in 940, and combines the data, in 945.

As described herein, the at least one vehicular moving relay 903 or 905 may perform data repeating without requesting a handover from the macro base station 907. Accordingly, the vehicular moving terminal 901 may receive a signal from the macro base station 907 and also receive signal that is repeated by one or more of the vehicular moving relays 903 and 905.

For example, if a signal or data is first received from the macro base station 907 and a signal is subsequently received from the at least one vehicular moving relay 903 or 905, or vice versa, the vehicular moving terminal 901 may combine the two signals into a signal to detect. For example, the signal received from the macro base station 907 and the signal received from the at least one vehicular moving relay 903 or 905 may be the same signal or may be different signals.

After the data is combined, the at least one vehicular moving relay 903 or 905 stops data repeating to the vehicular moving terminal 901 as the vehicular moving terminal 901 stops broadcasting the unique code, in 950.

FIG. 10 illustrates an example of a process in which a macro base station determines whether to use a vehicular moving relay and at least one vehicular moving relay stops data from repeating using a timer.

Referring to FIG. 10, the communication system includes a vehicular moving terminal 1001, vehicular moving relays 1003 and 1005, and a macro base station 1007.

The macro base station 1007 receives information about strength of a received signal from the vehicular moving terminal 1001 served by the macro base station 1007 and at least one vehicular moving relay 1003 or 1005, in 1010. For example, the information about the strength of the received signal may be a RSSI.

The macro base station 1007 determines that at least one vehicular moving relay 1003 or 1005 is to repeat data to the vehicular moving terminal 1001 based on the information about the strength of the received signal and information about a subscriber of the vehicular moving terminal 1001, in 1015.

In 1015, the macro base station 1007 may select a vehicular moving relay that is adjacent to the vehicular moving terminal 1001 based on information about positions of the vehicular moving terminal 101 and the at least one vehicular moving relay 1003 or 1005, and may determine the selected vehicular moving relay to repeat the data to the vehicular moving terminal 1001.

The macro base station 1007 requests the at least one vehicular moving relay 1003 or 1005 to repeat the data to the vehicular moving terminal 1001, in 1020.

In 1025, the at least one vehicular moving relay 1003 or 1005 determines whether to provide or support data repeating to the vehicular moving terminal 1001, without requesting a handover from the macro base station 1007, based on a unique code that is broadcasted by the vehicular moving terminal 1001.

In 1025, the at least one vehicular moving relay 1003 or 1005 may determine whether to repeat the data to the vehicular moving terminal 1001 based on at least one of a comparison of strength of a received signal of the unique code with a preset threshold value, an amount of a wireless resource that are available to the at least one vehicular moving relay 1003 or 1005, and the information about the subscriber of the vehicular moving terminal 1001.

For example, the at least one vehicular moving relay 1003 or 1005 may repeat the data to the adjacent vehicular moving terminal 1001 if the strength of the received signal of the unique code is greater than the preset threshold value and the amount of the wireless resource available to the at least one vehicular moving relay 1003 or 1005 is sufficient.

The at least one vehicular moving relay 1003 or 1005 drives a timer from a time of determining to repeat the data, in 1030.

The vehicular moving terminal 1001 receives data from the macro base station 1007, in 1035, receives data repeated by the at least one vehicular moving relay 1003 or 1005, in 1040, and combines the received signals, in 1045.

As described in various example, the at least one vehicular moving relay 1003 or 1005 may repeatedly broadcast data to the vehicular moving terminal 1001 without requesting a handover from the macro base station 1007 to the at least one vehicular moving relay 1003 or 1005.

Thus, the vehicular moving terminal 1001 may receive a signal from the macro base station 1007 and also receive a signal that is repeated by the vehicular moving relays 1003 and 1005.

Accordingly, if a signal or data is first received from the macro base station 1007 and a signal is subsequently received from the at least one vehicular moving relay 1003 or 1005, or vice versa, the vehicular moving terminal 1001 may combine the two signals into a signal to detect.

The at least one vehicular moving relay 1003 or 1005 stops data repeating to the vehicular moving terminal 1001, in 1055, as the timer terminates, in 1050.

Figure 11:
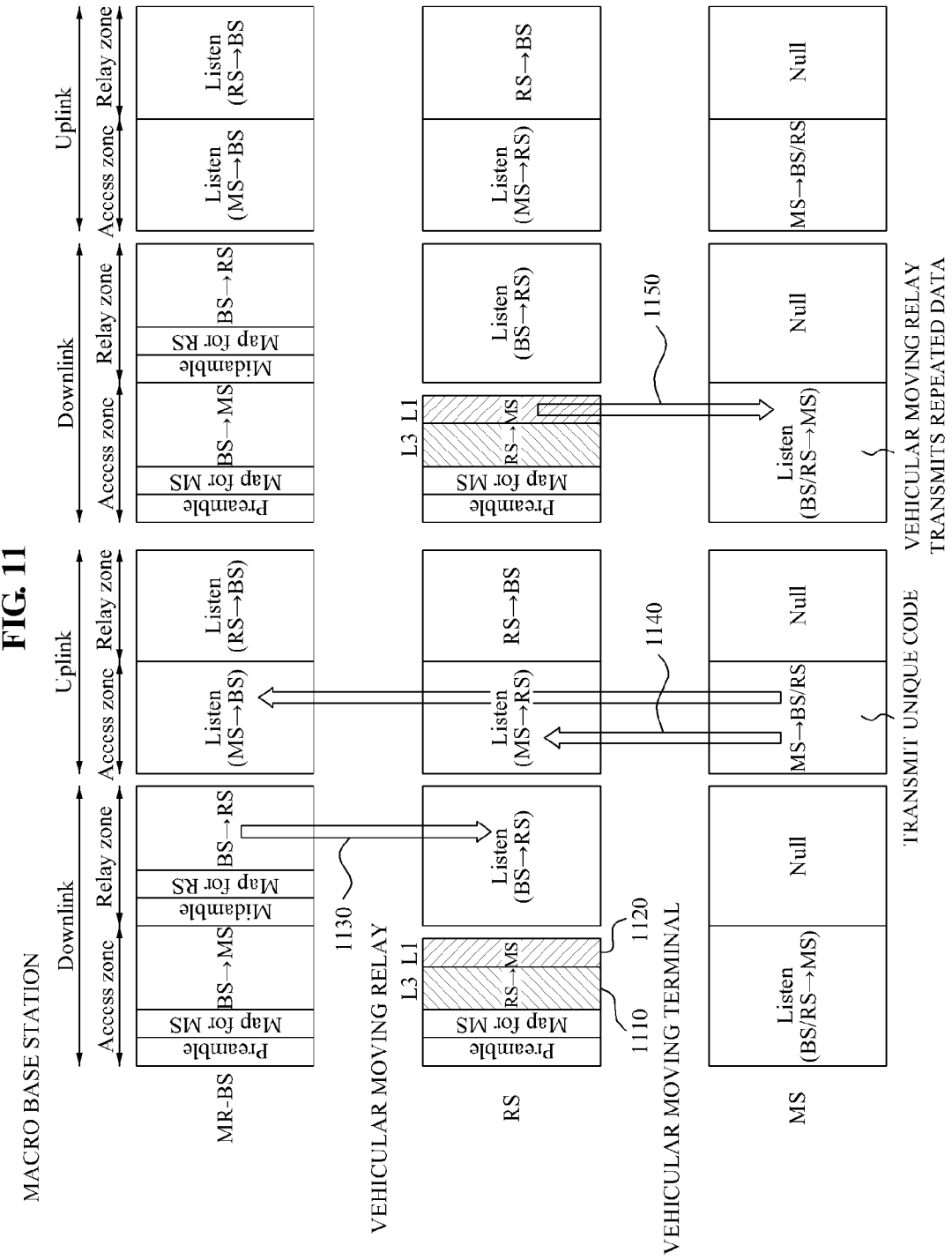
FIG. 11 is a diagram illustrating an example of a frame for a vehicular moving relay to operate simultaneously in layer 1 (L1) mode and in layer 3 (L3) mode in a TDD (Time division duplex) relay environment based on IEEE 802.16j non-transparent mode.

FIG. 11 illustrates an example of a frame for a vehicular moving relay to operate both in L1 mode and L3 mode in a TDD relay environment based on IEEE 802.16j non-transparent mode.

The vehicular moving relay RS may typically operate in L3 mode, and support resources to a vehicular moving terminal MS in order to perform an L1 mode relay operation, when a request is received from the vehicular moving terminal MS or a macro base station MR-BS.

If the vehicular moving relay RS is requested to repeat data to an adjacent vehicular moving terminal, the vehicular moving relay RS may divide wireless resources that are allocated from the vehicular moving relay RS to the vehicular moving terminal MS in an access zone of a downlink channel into two. That is, the vehicular moving relay RS may divide the access zone of the downlink channel into a resource area 1110 in which the vehicular moving relay operates in L3 mode and a resource area 1120 in which the vehicular moving relay operates in L1 mode.

The macro base station MR-BS may provide information about a unique code and a wireless resource of the vehicular moving terminal MS for the unique code to the vehicular moving relay RS using a relay zone of the downlink channel, as is shown in 1130.

The vehicular moving terminal MS transmits the unique code allocated by the macro base station MR-BS to the vehicular moving relay RS and the macro base station MR-BS using an access zone of an uplink channel, as is shown in 1140.

The vehicular moving relay RS repeatedly broadcasts data received from the macro base station MR-BS to the vehicular moving terminal MS using the resource area in which the vehicular moving relay operates in L1 mode in the access zone of the downlink channel, as is shown in 1150.

Figure 12:
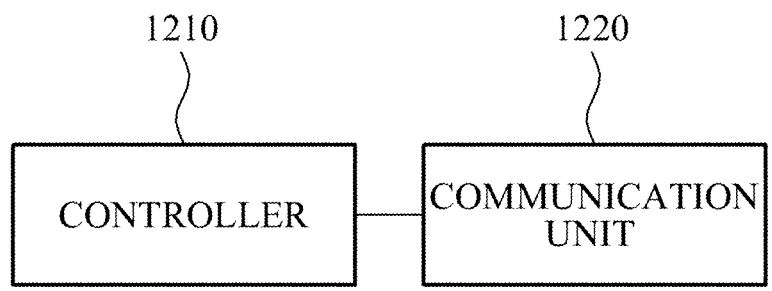
FIG. 12 illustrates an example of a terminal.

FIG. 12 illustrates an example of a terminal. The terminal may be a vehicular moving terminal as described by the examples herein. For example, the terminal may be a cellular phone, a personal computer, a smart phone, a notebook, a tablet, an MP3 player, and the like.

Referring to FIG. 12, terminal 1200 includes a controller 1210 and a communication unit 1220. The mobile terminal may be served by a macro base station. The controller 1210 may determine whether a quality of service (QoS) of a signal provided by the macro base station has dropped below a threshold level.

The communication unit 1220 may transmit a request to the macro base station indicating the QoS of the signal has dropped below the threshold level. The communication unit 1220 may receive code from the macro base station. The communication unit 1220 may establish a connection with a vehicular mobile relay. Accordingly, the communication unit 1220 may simultaneously receive the signal from the macro base station and the vehicular moving relay without performing a handover to the vehicular moving relay.

The controller 1210 may combine the signal received from the macro base station and the signal received from the vehicular moving relay to generate a received signal.

In this example, the communication unit may include a transmitter, a receiver, and/or a transceiver to communicate with the macro base station and one or more vehicular moving relays.

The examples described with respect to FIGS. 1-11 herein are applicable to terminal 1200 illustrated in FIG. 12.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and non-transitory computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a moving terminal in a communication system including a vehicular moving relay, the method comprising:
   receiving data transmitted by a macro base station;
   checking a quality of a communication service provided to the moving terminal using the received data;
   determining whether to improve the quality of the communication service in response to checking the quality of the communication service;
   in response to determining to improve the quality of the communication service, broadcasting a unique code of the moving terminal in a virtual cell of the moving terminal to search for the vehicular moving relay in a mode that repeats data to the vehicular moving terminal without requesting a handover from the macro base station to the vehicular moving relay, wherein the unique code is allocated by the macro base station and information about the unique code is broadcasted by the moving terminal in a macro cell of the macro base station;
   receiving data repeated by the vehicular moving relay using the unique code, wherein the vehicular moving relay receives the information broadcasted in the macro cell by being positioned in the macro cell and receives the unique code broadcasted in the virtual cell by being positioned in the virtual cell; and
   combining the data received from the macro base station and the data repeated by the vehicular moving relay.

2. The method of claim 1, wherein the checking comprises checking the quality of the communication service by comparing the quality of the communication service with a strength of a signal received by the moving terminal from the macro base station or the quality of a service based on information about a subscriber of the moving terminal.

3. The method of claim 1, further comprising:
   receiving the information about the unique code and a wireless resource of the moving terminal corresponding to the unique code, from the macro base station.

4. The method of claim 1, further comprising:
   measuring the strength of a signal received from the macro base station;
   comparing the strength of the signal received from the macro base station with a preset threshold value; and
   stopping the broadcasting of the unique code so that the at least one vehicular moving relay stops repeating the data based on a result of the comparison.

5. The method of claim 1, further comprising:
   driving a timer from a time at which the at least one vehicular moving relay repeats the data; and
   stopping the broadcasting of the unique code so that the at least one vehicular moving relay stops repeating the data as the timer terminates.

6. The method of claim 1, further comprising:
   requesting the macro base station to allocate the unique code, based on the checked quality of the communication service.

7. The method of claim 1, wherein the at least one vehicular moving relay is in a mode to repeat data to the moving terminal without requesting a handover from the macro base station.

8. A communication method of a vehicular moving relay, the method comprising:
   receiving, by being positioned in a macro cell of a macro base station, information about a unique code allocated to a moving terminal in response to a determination to improve a quality of a communication service, wherein the information about the unique code is broadcasted in the macro cell by the macro base station;

receiving, by being positioned in a virtual cell of the moving terminal, the unique code, wherein the unique code is broadcasted in the virtual cell by the moving terminal;

determining whether to repeat data to the moving terminal without requesting a handover from the macro base station using the unique code; and repeating the data to the moving terminal in response to determining to repeat the data, wherein the allocating the unique code to the moving terminal comprises allocating a wireless resource with respect to a layer 3 (L3) mode prior to a wireless resource with respect to a layer 1 (L1) mode in response to the vehicular moving relay operating in the L3 mode in which a handover from the macro base station is requested and operating in the L1 mode in which the vehicular moving relay repeats the data to an adjacent moving terminal without requesting the handover from the macro base station.

9. The method of claim 8, further comprising:
stopping the repeating of the data to the moving terminal as the moving terminal stops broadcasting the unique code.

10. The method of claim 8, further comprising:
driving a timer from a time at which it is determined to repeat data; and
stopping the repeating of the data to the moving terminal as the timer terminates.

11. The method of claim 8, wherein the determining comprises determining whether to repeat the data to the moving terminal based on at least one of a result of comparison of a preset threshold value with strength of a received signal of the unique code, an amount of wireless resources available to the vehicular moving relay, and information about a subscriber of the moving terminal.

12. The method of claim 8, further comprising:
determining whether the vehicular moving relay repeats the data to a moving terminal that is adjacent to the vehicular moving relay.

13. The method of claim 12, wherein the determining whether to repeat the data to the adjacent moving terminal comprises determining whether the vehicular moving relay operates in layer 3 (L3) mode in which a handover from the macro base station is requested or operates in both L3 mode and in layer 1 (L1) mode in which the vehicular moving relay repeats the data to the adjacent moving terminal without requesting the handover from the macro base station.

14. The method of claim 12, wherein the vehicular moving relay divides an access zone of a downlink channel into a resource area in which the vehicular moving relay operates in L3 mode and another resource area in which the vehicular moving relay operates in L1 mode.

15. A communication method of a macro base station in a communication system including a vehicular moving relay, the method comprising:
transmitting data to a moving terminal;
allocating a unique code of the moving terminal and a wireless resource of the moving terminal corresponding to the unique code, in response to a request for allocation of the unique code from the moving terminal or a determination to improve a quality of a communication service;

broadcasting, in a macro cell of the macro base station, information about the unique code and the wireless resource of the moving terminal corresponding to the unique code, in order to search for the vehicular moving relay in a mode to repeat the data to the moving terminal without requesting a handover from the macro base station; and transmitting data to the vehicular moving relay, wherein the vehicular moving relay receives the information broadcasted in the macro cell by being positioned in the macro cell and receives the unique code broadcasted in a virtual cell of the moving terminal by being positioned in the virtual cell, wherein the allocating comprises allocating a wireless resource with respect to a layer 3 (L3) mode prior to a wireless resource with respect to a layer 1 (L1) mode in response to the vehicular moving relay operating in the L3 mode in which a handover from the macro base station is requested and operating in the L1 mode in which the vehicular moving relay repeats the data to an adjacent moving terminal without requesting the handover from the macro base station.

16. The method of claim 15, wherein the wireless resource of the moving terminal for the unique code comprises a wireless resource for a link between the macro base station and the moving terminal and a wireless resource for a link between the at least one vehicular moving relay and the moving terminal.

17. A non-transitory computer-readable storage medium having stored therein program instructions to cause a processor to implement a method comprising:
receiving data transmitted by a macro base station;
checking a quality of a communication service provided to a moving terminal using the received data;
determining whether to improve the quality of the communication service in response to checking the quality of the communication service;
in response to determining to improve the quality of the communication service, broadcasting a unique code of the moving terminal in a virtual cell of the moving terminal to search for a vehicular moving relay in a mode that repeats data to the moving terminal without requesting a handover from a macro base station to the vehicular moving relay, wherein the unique code is allocated by the macro base station and information about the unique code is broadcasted by the moving terminal in a macro cell of the macro base station;
receiving data repeated by the vehicular moving relay using the unique code, wherein the vehicular moving relay receives the information broadcasted in the macro cell by being positioned in the macro cell and receives the unique code broadcasted in the virtual cell by being positioned in the virtual cell; and
combining the data received from the macro base station and the data repeated by the vehicular moving relay.

* * * * *